Oct. 25, 1932. L. T. COLE 1,885,083
AUTOMOBILE SERVICE HAND TOOL
Filed June 6, 1931 2 Sheets-Sheet 1

Laurel T. Cole,
INVENTOR
BY Victor J. Evans and Co.
ATTORNEY

Oct. 25, 1932. L. T. COLE 1,885,083
AUTOMOBILE SERVICE HAND TOOL
Filed June 6, 1931  2 Sheets-Sheet 2
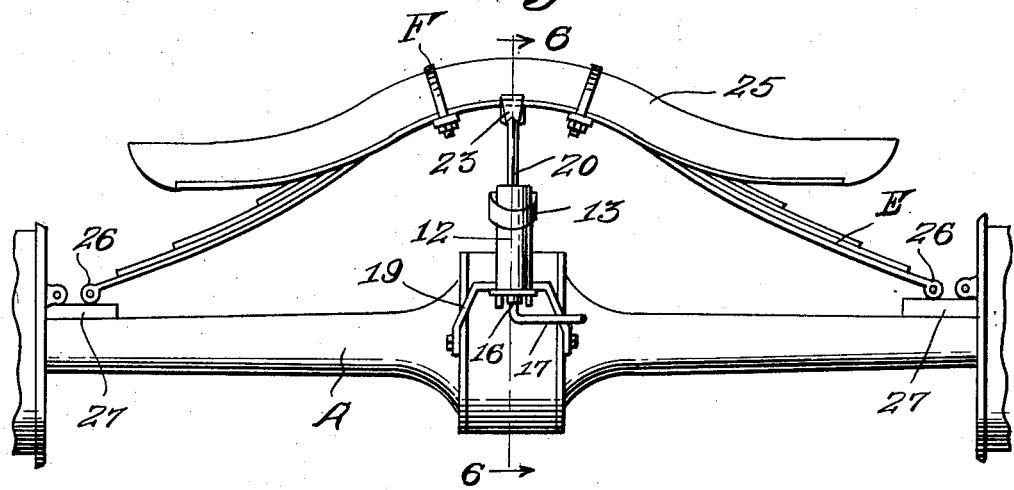
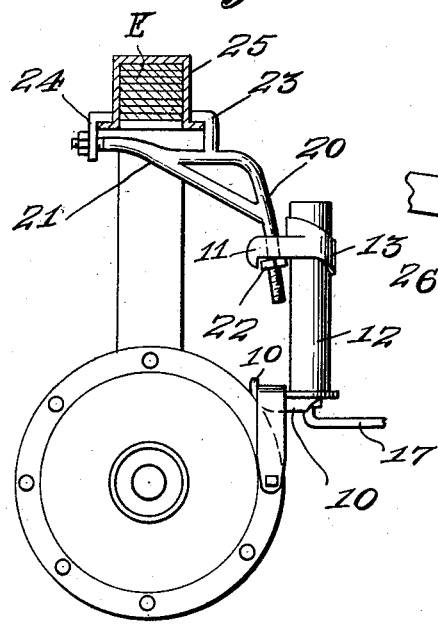
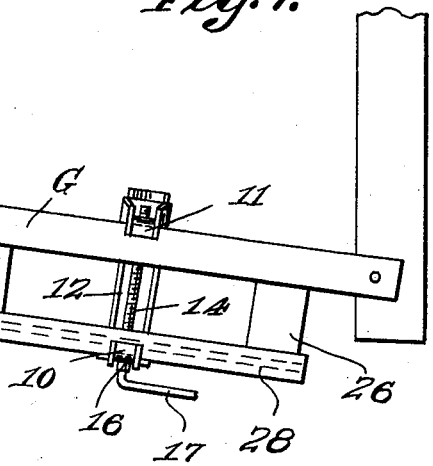
Laurel T. Cole,
INVENTOR
BY Victor J. Evans
and Co. ATTORNEY Patented Oct. 25, 1932

1,885,083

UNITED STATES PATENT OFFICE

LAUREL T. COLE, OF LOS ANGELES, CALIFORNIA

AUTOMOBILE SERVICE HAND TOOL

Application filed June 6, 1931. Serial No. 542,647.

The invention relates to a hand tool of a portable type and more especially to an automobile service hand tool.

The primary object of the invention is the provision of a tool of this character wherein it is serviceable for the straightening of the chassis of automobiles, the removal of springs therefrom or the assembling therein of complete new springs with the installation of the same to the spring shackles, the tool being of novel form to permit the application thereof with dispatch and the convenient handling of the same for service upon an automobile.

Another object of the invention is the provision of a tool of this character, wherein the construction thereof permits the assembling and installation of springs within an automobile when the body thereof is stationary or fixed, the assembling of the springs either attached to the automobile or detached from the same can be effected without the requirement of supplemental tools or equipment therefor, the tool being of such construction that is adaptable for the straightening of the chassis or other frame of an automobile without removing the body and is susceptible of many adjustments and positionings.

A further object of the invention is the provision of a tool of this character which is extremely simple in construction, thoroughly reliable and efficient for the purpose intended thereof, strong, durable, readily portable, hand controlled and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 5 is a fragmentary elevation showing the application of the tool for use in the installing of a rear spring in the automobile and the mounting of the tool thereon.

Figure 6 is a sectional view on the line 6—6 of Figure 5 looking in the direction of the arrows.

Figure 7 is a fragmentary plan view of an automobile frame or chassis showing the hand tool applied for the straightening of the side sill or beam of said chassis.

Similar reference characters indicate corresponding parts through the several views in the drawings.

Figure 1:
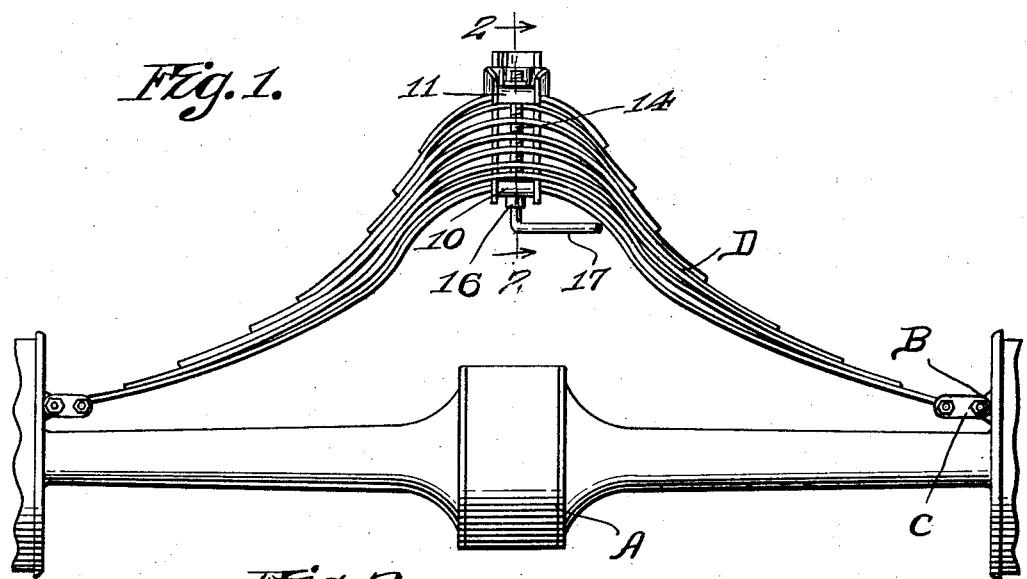
Figure 1 is a fragmentary rear elevation of an automobile showing the hand tool constructed in accordance with the invention applied to the rear spring of said automobile for the compressing of the leaves of such spring.
Figure 2:
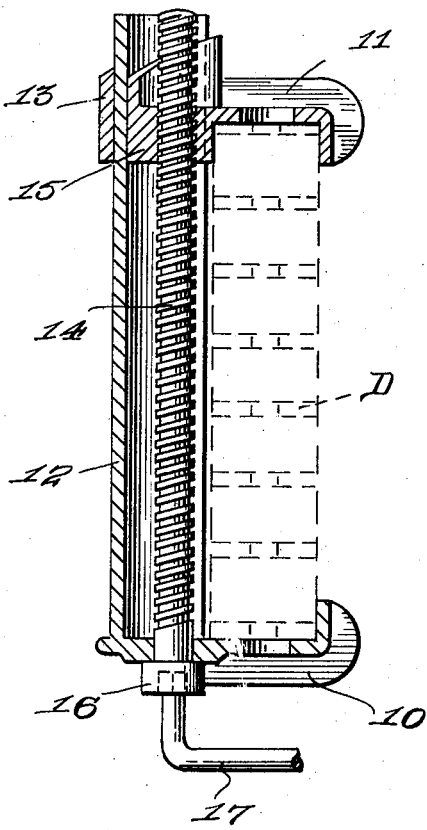
Figure 2 is an enlarged sectional view on the line 2—2 of Figure 1.
Figure 3:
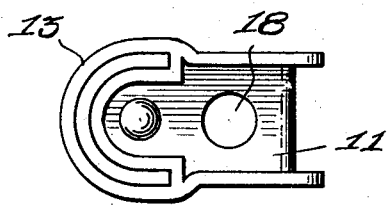
Figure 3 is a top plan view of the movable jaw of the tool.
Figure 4:
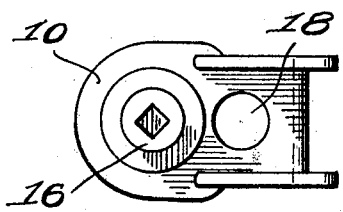
Figure 4 is a bottom plan view of the stationary jaw of the tool.

Referring to the drawings in detail, A designates generally the rear housing of an automobile, B the perch bushing with the hanger C connected therewith and the rear spring D assembled and connected with said hanger, these parts being shown merely to illustrate the application of the hand tool constituting the present invention for compressing the leaves of the spring D and hereinafter fully described.

The hand tool comprises stationary and movable jaws 10 and 11 respectively, the stationary jaw being integrally formed at the lower end of a channeled guide stem 12 which may be of any required length, while the movable jaw 11 is formed with a loop-like runner or slide 13 which is telescoped on or slidably embraces the stem 12 for guiding the said movable jaw 11 in its adjustment to and from the stationary jaw 10 of the tool. Swiveled in the lower end of the stem 12 is a feed screw 14, the latter being confined within the channel of the stem 12 and is threaded in a boss 15 formed on the movable jaw 11, which boss is also confined in said stem 12 and by the turning of this screw 14 said movable jaw 11 will be adjusted with respect to the stationary jaw 10.

The screw 14 at one end is formed with a socketed head 16 for accommodating the detachable crank or handle 17 for manual operation of the screw.

To compress the leaves of the spring D the tool is applied as shown in Figure 1 of the drawings so that the stationary jaw will engage beneath the lowermost leaf of the spring D and the movable jaw 11 overhand and engage the uppermost leaf of said spring D, then on adjustment of the screw 14 by operating the crank or handle 17 which is detachable from the head 16 of the screw the movable jaw 11 can be caused to approach the stationary jaw 10 and in this fashion the leaves of the spring D will be compressed in their proper assembled relation to each other.

The jaws 10 and 11 each is provided with an aperture or hole 18 for the connection of a supplemental grip or hanger therewith, according to the use of the hand tool.

In Figures 5 and 6 of the drawings the hand tool is shown as applied for the installing of the spring E connected with the body frame of an automobile by the clips F and in this application of the tool the stationary jaw 10 is engaged with a yoke 19 which is bolted or otherwise made fast to the rear housing A at the central portion thereof, while engaged in the hole 18 in the movable jaw 11 of said tool is the shank 20 of a bracket 21, the shank 20 being detachably secured through the medium of a nut 22 threaded on said shank and this bracket 21 is formed with stationary and adjustable jaws 23 and 24 respectively for the detachable engagement thereof with the cross beam 25 of the frame or chassis of the automobile as is clearly shown in Figures 5 and 6 of the drawings so that in this manner on working the hand tool the spring E can be straightened when its ends 26 are resting upon temporary blocks 27 interposed between the rear housing A and said ends 26 to guide the latter on the straightening of the spring E to the perch bushing and at the proper distance therefrom for the application of the hangers C illustrated in Figure 1 of the drawings so that the said spring E can be installed with dispatch in the automobile.

In Figure 7 of the drawings the hand tool is shown as applied to the side sill G of the chassis or frame of an automobile and in this application the movable jaw 11 is engaged about the side sill F while the stationary jaw 10 of said tool is engaged by a bridge piece 28 resting against spaced blocks 26, these engaged with the side sills G at the proper distance spaced from each other and on opposite sides with relation to the tool so that any bend or kink in the side sill G can be eliminated or the said side sill straightened by the use of the hand tool.

While there has been illustrated in the drawings several applications of the hand tool, the same is susceptible of other applications for the execution of work incident to an automobile for service thereon.

The tool is also usable for compressing a spring for replacing tie bolts or the addition of a spring leaf or leaves or replacement of broken leaves without removing the main leaf or spring from the automobile or the like. Also the tool is susceptible for use in compressing a spring for the replacing of the tie bolt with dispatch and without excessive labor on the part of the user of the tool.

What is claimed is:—

1. A hand tool of the character described comprising stationary and movable jaws, a channeled stem carrying the stationary jaw, means slidably connecting the movable jaw with said stem, a feed screw journaled in the stem and operative upon the movable jaw to adjust the same, a detachable hand crank fitted with the feed screw, each jaw being formed with an opening, a clamping bracket adapted for detachable and adjustable connection in the opening of either jaw and a yoke engaging the other jaw.

2. A hand tool of the character described comprising stationary and movable jaws, a channeled stem carrying the stationary jaw, means slidably connecting the movable jaw with said stem, a feed screw journaled in the stem and operative upon the movable jaw to adjust the same, a detachable hand crank fitted with the feed screw, each jaw being formed with an opening, a clamping bracket adapted for detachable and adjustable connection in the opening of either jaw, and means engageable with the other jaw for the hanging of the tool when the bracket is engaged in the opening in one jaw.

In testimony whereof I affix my signature.

LAUREL T. COLE.